(Model.)
J. W. COVERT.
COMBINED HAY RAKE AND TEDDER.
No. 245,940. Patented Aug. 23, 1881.
2 Sheets—Sheet 1.
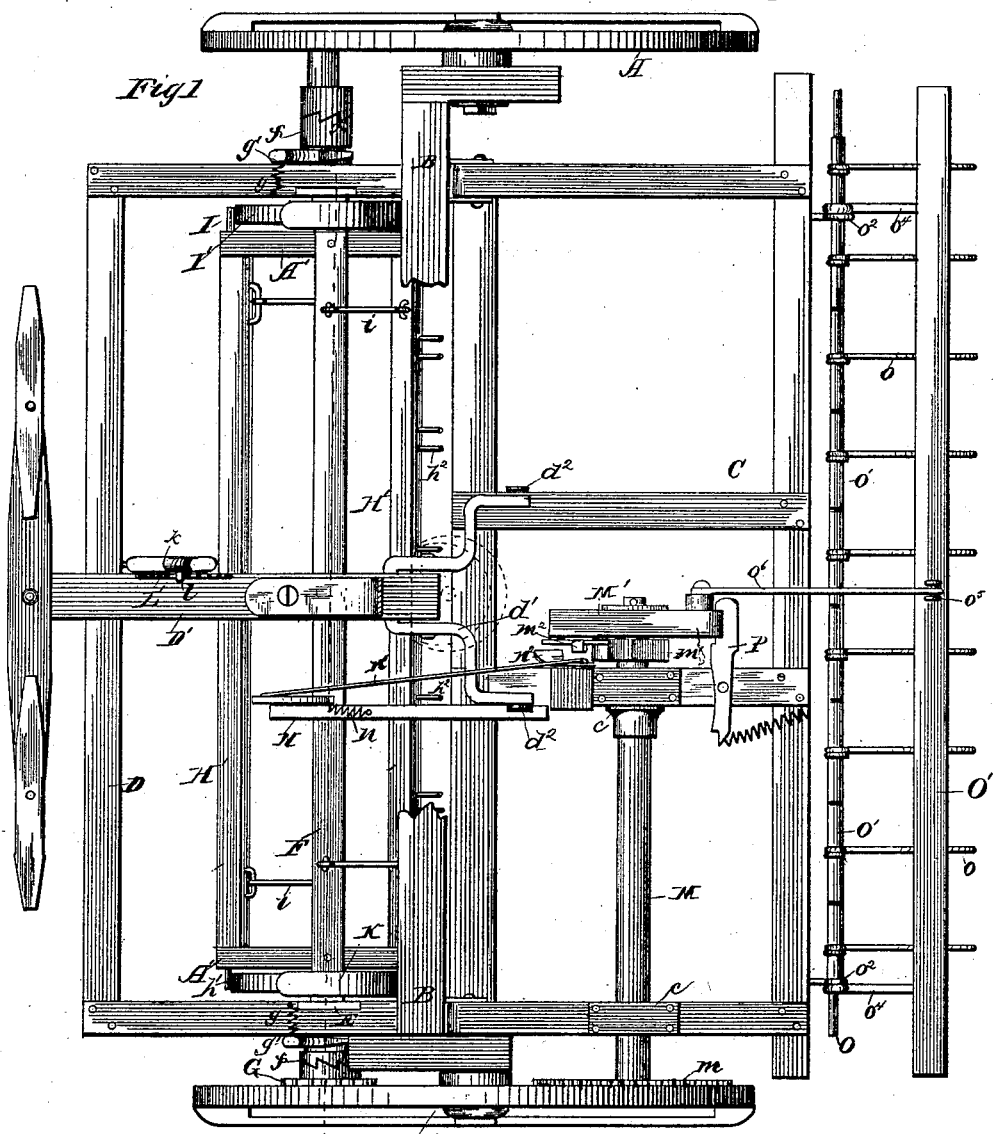
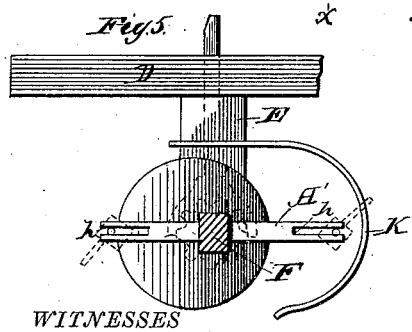
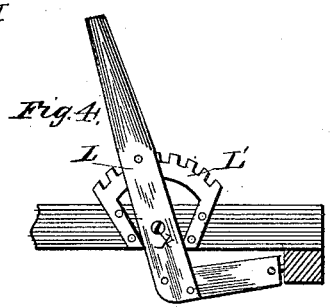
WITNESSES
INVENTOR
John W. Covert
by C. A. Snow & Co.
Attorneys

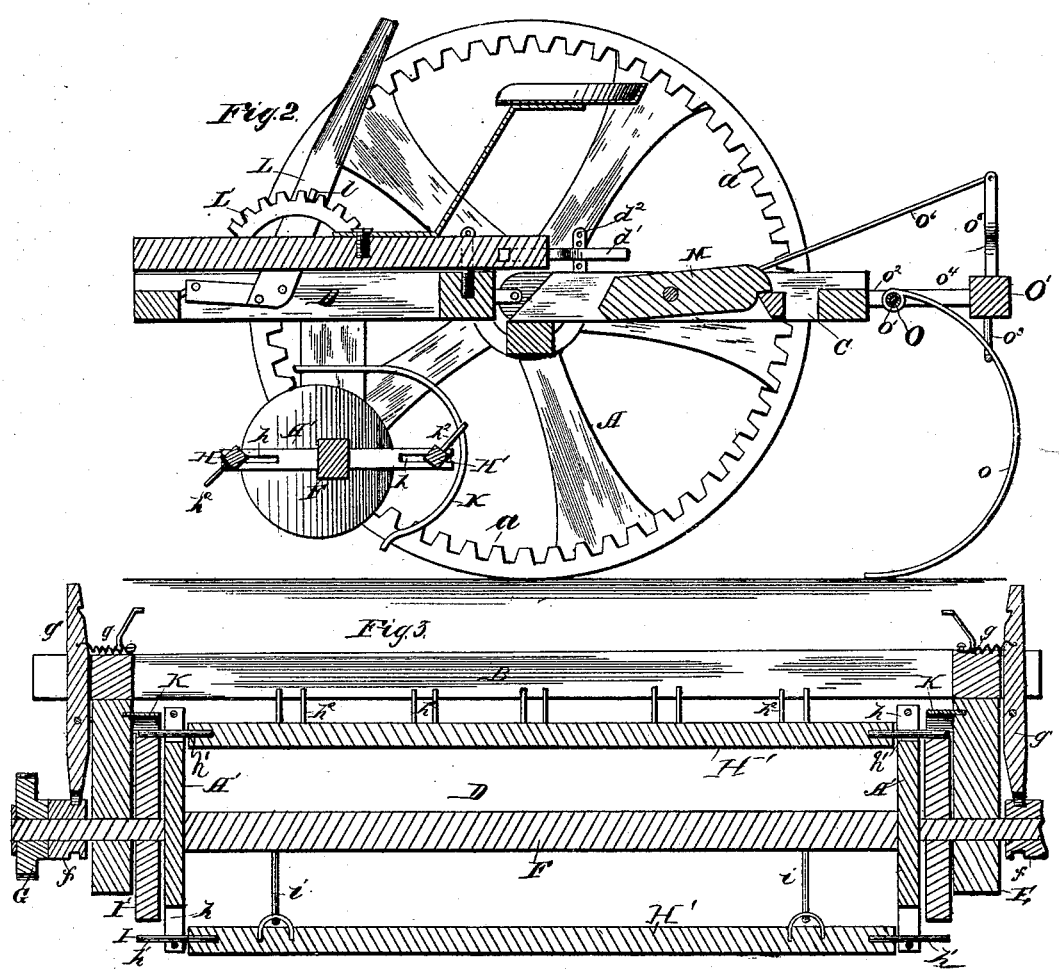

UNITED STATES PATENT OFFICE.

JOHN WARREN COVERT, OF MIDDLEBUSH, NEW JERSEY.

COMBINED HAY-RAKE AND TEDDER.

SPECIFICATION forming part of Letters Patent No. 245,940, dated August 23, 1881.

Application filed July 6, 1881. (Model.)

*To all whom it may concern:*

Be it known that I, JOHN WARREN COVERT, of Middlebush, in the county of Somerset and State of New Jersey, have invented certain new and useful Improvements in Combined Hay-Rake and Tedder; and I do hereby declare that the following is a full, clear, and exact description of the invention, which will enable others skilled in the art to which it appertains to make and use the same, reference being had to the accompanying drawings, which form a part of this specification.

My invention relates to a combined hay-rake and tedder; and the novelty consists in the construction and arrangement of parts, as will be more fully hereinafter set forth, and specifically pointed out in the claims.

The object of the invention is to produce a combined tedder and hay-rake having facilities for readily throwing either or both of these devices in or out of operation at will; and to this end the invention consists of the mechanisms and parts, as will be presently explained, constructed, arranged, and combined with each other as is clearly shown in the accompanying drawings, which form a part of this specification, and in which—

Figure 1 is a top-plan view, partially in section; Fig. 2, a central longitudinal section; Fig. 3, a section through the line $x\,x$ of Fig. 1; Figs. 4 and 5, detail views.

To enable others skilled in the art to make and use my invention, I will now describe the construction and operation of the same, and to that end refer to the drawings, in which similar letters of reference indicate like parts in all the figures.

A A represent the riding or driving wheels, each having a series of inner peripheral cogs, $a$, the said wheels A being hung upon an elbow-axle, B, bowed toward the front to allow the pivotal point of the rake-frame C to be upon a plane with the journals.

Extending forward from the axle B is the tedder-frame D, and hinged to the axle is the pole D', having rearwardly-extending bifurcated arms $d'$, which are placed adjacent to perforated standards $d^2$ upon the rake-frame, and this arrangement allows the vertical adjustment of the two frames C and D in relation to each other at will.

The rake-frame and its operating parts and mechanisms are simply secured to the axle by bolts or the like, and when it is not desired to rake the same may be readily disengaged and removed, leaving a complete and efficient sulky-tedder, which I will now describe.

The specific construction of the rake and its operative mechanism will be made the subject of a separate application.

Rigid with the tedder-frame D, upon each side, are hangers or brackets E, in which is journaled a shaft, F, provided near each end with a clutch, $f$, which revolves with the shaft, slides loosely thereon, and engages a pinion, G, when forced outward, the said pinion turning loosely on the shaft when not engaged, and being at all times in mesh with the gear $a$. The clutch is held into engagement with the pinion by a spring, $g$, and hand-lever $g'$, except when the force of the spring is overcome by the driver, in which case the pinion G rides idly and the tedder-shaft does not revolve.

Rigid with the tedder-shaft F are two cross-bars, A', their ends being slotted at $h$ to receive loosely the gudgeons $h'$ of the tedder-bars H', having teeth $h^2$, the said bars being loosely connected to the revolving shaft F by links $i$.

The ends of the gudgeons $h'$ may be provided with friction-rolls, which traverse an eccentric guideway, I', secured upon brackets, as shown. As the tedder-teeth come into action the friction-rolls leave the control of the eccentric and the weight of the hay forces the gudgeons up into the slots, thus allowing the teeth to leave the hay in an approximately vertical position, and preventing the liability of carrying the hay up with them and clogging the machine by becoming snarled around the tedder.

To prevent the hay from interfering with the free and efficient action of the friction-rolls on the eccentric guides, I provide a guard, K, as shown.

Pivoted to the tongue at $k$ is an elbow-lever, L, the trigger $l$ of which operates in a segmental ratchet, L', secured upon the tongue, and the arm of which is loosely secured to the tedder-frame. By means of this lever the tedder-frame may be raised or lowered at will.

From the foregoing description it will be observed that the machine may be converted into either a hay-tedder or a hay-rake, or both at the same time, at will; that both devices are hinged or pivoted directly in the plane of the driving-wheel journals; that the tedder-teeth will not clog, but that they obviate this fault automatically; that the tedder and rake may be adjusted in relation to the service required and to the position of the driving-wheels at will; and that both devices may be thrown readily in or out of operation, as may be desired.

Modifications may be made in details of construction without departing from the principle or sacrificing the advantages of my invention, the operation of which will be readily understood from the foregoing description. For instance, a hook may be supplied, attached to the rake-frame, and adapted to engage with the rake after it has been elevated, and hold it locked as thus elevated while being transported from one field to another, or the like.

Having thus fully described my invention, what I claim as new, and desire to secure by Letters Patent of the United States, is—

1. A combined hay-rake and tedder, the latter in front of and the former arranged in rear of the axle of the sulky, and both devices being pivoted in the transverse line of the riding-wheel journals, as and for the purposes set forth.

2. The combination of the elbow-axle and riding-wheels with the rake-frame and tedder-frame, hinged together in the line of the journals, as specified.

3. The tedder-frame D and pole D', having bifurcated arms $d'$, combined with the rake-frame C, having perforated standards $d^2$, and means for adjustably securing the same together, as and for the purposes set forth.

4. The tedder-shaft F and slotted cross-bars A' $h$, combined with tedder-bars H' $h^2$, having gudgeons $h'$, links $i$ for connecting said tedder-bars with tedder-shaft, eccentric guideway I', and operating-gear, as set forth.

In testimony that I claim the foregoing as my own I have hereto affixed my signature in presence of two witnesses.

JOHN WARREN COVERT.

Witnesses:
  GARRETSON HAGEMAN,
  BENJAMIN B. HAGEMAN.